United States Patent [19]

Kenmochi

[11] Patent Number: 5,726,278
[45] Date of Patent: Mar. 10, 1998

[54] PROCESS FOR THE MANUFACTURE OF POLYAMIDE RESIN COMPOSITION

[75] Inventor: Tsunao Kenmochi, Ustunomiya, Japan

[73] Assignee: E. I. du Pont de Nemours and Company, Wilmington, Del.

[21] Appl. No.: 632,493
[22] PCT Filed: Oct. 29, 1993
[86] PCT No.: PCT/US93/10454
 § 371 Date: Apr. 24, 1996
 § 102(e) Date: Apr. 24, 1996
[87] PCT Pub. No.: WO95/11788
 PCT Pub. Date: May 4, 1995
[51] Int. Cl.$^6$ .................... C08L 77/00; C08G 73/00
[52] U.S. Cl. .................. 528/310; 528/318; 528/322; 528/323; 525/183; 525/184; 525/178; 525/420; 525/424; 525/432; 524/413; 524/538; 524/600; 524/606
[58] Field of Search .................... 524/413, 538, 524/600, 606; 525/183, 420, 184, 424, 178, 432; 528/323, 310, 318, 322

[56] References Cited

U.S. PATENT DOCUMENTS

| | | | |
|---|---|---|---|
| 3,519,595 | 7/1970 | Hermann et al. | 524/413 |
| 4,172,069 | 10/1979 | Cordes et al. | 524/413 |
| 4,195,015 | 3/1980 | Deleens et al. | 524/413 |
| 4,292,194 | 9/1981 | Perazzoni et al. | 524/413 |
| 4,837,265 | 6/1989 | Istel et al. | 524/413 |
| 4,977,213 | 12/1990 | Giroud-Abel et al. | 524/413 |
| 5,169,582 | 12/1992 | Illing | 524/413 |

*Primary Examiner*—P. Hampton-Hightower

[57] ABSTRACT

A process for manufacturing polyamide molded articles having improved resistance to discoloration while also having good heat stability involving preparing masterbatch pellets of at least a polyamide and a heat stabilizer, diluting the polyamide masterbatch pellets with a dilution polyamide resin to form a polyamide mixture, and molding the polyamide mixture into a molded article.

3 Claims, 2 Drawing Sheets

PROCESS FOR THE MANUFACTURE OF POLYAMIDE RESIN COMPOSITION

BACKGROUND OF THE INVENTION

The present invention relates to a process for manufacturing a polyamide resin composition. Specifically, it relates to a manufacturing process which comprises adding a heat stabilizer to improve the heat stability and the weathering resistance of a polyamide and, at the same time, to suppress any significant change in color of the polyamide.

Incorporating an effective copper compound into a polyamide composition for improving the heat resistance and weathering resistance of the polyamide composition is a well-known method for preventing thermal oxidative degradation of said composition. Additives can be added to polyamide compositions at any stage before molding the polyamide composition into molded article. For example, one of the methods used to incorporate an additive into a polyamide composition involves dry blending the polyamide with the additive, followed by melt mixing and extruding the dry-blended product into pellets. Another known method for compounding an additive into a polyamide composition is to prepare master polyamide pellets, followed by blending these master pellets with dilution polyamide pellets.

However, the manufacture of a polyamide composition always requires attention to a reduction of the thermal history. A copper-type heat stabilizer may be incorporated into a polyamide composition by adding the heat stabilizer to a polyamide containing no heat stabilizer via an extruder or by adding the heat stabilizer to the polyamide during its polymerization. A comparison of the two methods shows that the latter provides a product with better color compared to the former so that heat stabilizers are, in general, added to polyamides during the polymerization thereof. With the attention that has been paid to the suppression of any change in the color of polyamide compositions, any post-polymerization additions, including additions to polyamides in the form of master pellets, have not been generally practiced heretofore.

The addition of an organic heat stabilizer to a polyamide composition has been found to not create any serious yellowing problem for the composition, but a copper-type heat stabilizer has been found to create a yellowing problem for the polyamide compositions, depending upon their heat history. It is further known that the addition of a copper-type heat stabilizer to a polyamide composition greatly changes the color thereof, the extent of which depends upon the amount of copper-type heat stabilizer added. Thus, the greater the amount of copper-type heat stabilizer added, the greater the degree of change in color in the resultant polyamide composition. FIG. 1 shows a relationship between the amount of the copper-type heat stabilizer added to a polyamide composition and the yellowing thereof. By "yellowing", it is meant the extent of yellowing experienced by a molded polyamide article, said yellowing being expressed by the value YI-C. The YI-C is measured on a sample of pellets or plates with an area of at least 5 cm×5 cm. Pellets in a glass cup are used for measurement. The measurement is possible with an area less than this range, but precision drops. The measurement is made by a differential color meter. The relationship between YI-C and color in terms of the absolute coordinates (X, Y, Z coordinates) is given for the following formula:

$$YI-C = [100(1.274976795X - 1.058398178Z)]/Y$$

Based on the above, it is found that the greater the amount of the copper-type heat stabilizer added to the polyamide composition for improved heat stability, the greater the extent of yellowing thereof. When such a yellowed polyamide composition is used to prepare a molded article, a pigment or coloring agent is normally added for coloring the molded article. However, since the composition of the polyamide resin itself is yellowed with the incorporation of the above stabilizer, coloring the molded article to the desired color will require greater amounts of pigments or coloring agents. If a colored resin as obtained is to be colored in a different color, an inorganic pigment, such as titanium oxide, must be incorporated in large amounts. However, incorporating a large amount of pigment or coloring agent will be deficient in that the heat stability of the polyamide composition during melting will decrease, thereby making molding difficult. At the same time, the mechanical strength of the molded article, particularly the elongation at the break, will be adversely affected.

The above situation results in the need for developing a process for manufacturing polyamide compositions which comprises incorporating a heat stabilizer in the polyamide composition so as to suppress any significant increase in polyamide yellowing caused by the heat stabilizer, while still improving the heat stability and weathering resistance of the polyamide composition. As a result, the amount of a colorant needed for coloring any shaped article made from such a composition can be decreased, with a resultant reduction in the lowering of mechanical properties, which would result from increasing the amount of the coloring agent to be added.

An extensive study by the present inventors in search of a solution to the above problems has led to the finding that a molded article with much reduced coloration can be obtained by preparing master polyamide pellets from a polyamide masterbatch containing a high content of a heat stabilizer, followed by compounding these master polyamide pellets with a dilution polyamide resin, and then molding articles from said pellets after compounding them together.

That is, the present invention relates to a process for manufacturing a polyamide composition molded article comprising the steps of (a) preparing a polyamide composition masterbatch containing a high content of a heat stabilizer by compounding a polyamide resin with a heat stabilizer, (b) melt-mixing, extruding, and pelletizing the masterbatch with heating into master pellets, (c) mixing these master pellets with a dilution polyamide resin so as to generate a mixture with a heat stabilizer content falling within a range of which is needed for heat stabilization of a polyamide composition, and (d) melt molding into articles under required heating.

The process of this invention permits the manufacture of a polyamide composition molded article with much less yellowing than would be expected from the content of the heat stabilizer in the polyamide composition molded article.

It is not completely clear as to the theory explaining why the polyamide composition molded article obtained by the process of this invention has a much lower degree of coloration (or yellowing) than the degree of coloration which would be expected from the amount of heat stabilizer present in the composition. Such considerable improvement in terms of coloration may be rationalized by the fact that the yellowing capability of the heat stabilizer towards the polyamide resin is completely or mostly consumed during the preparation of master pellets, so that by the time it is compounded with a dilution polyamide, the heat stabilizer no longer has any remaining yellowing capability toward the dilution polyamide resin. Obviously, such a coloration mechanism is based on simple speculation and this coloring mechanism should in no way give a limiting interpretation to the present invention.

DETAILED DESCRIPTION OF THE INVENTION

The polyamides used in the present invention are well known in the art and are commercially available. The polyamide is a high molecular weight material in which hydrocarbon groups or hydrocarbon groups interrupted by oxygen or sulfur are linked together by amide bonds. It has a molecular weight of at least 5,000 in order to exhibit any moldability. It includes a material generally called "nylon".

More specifically, the polyamide useful herein may be one prepared from a linear diamine represented by the formula

$H_2N-(CH_2)_x-NH_2$, in which x is an integer between 6 and 12, and a linear dicarboxylic acid represented by the formula

$HO_2C-(CH_2)_y-CO_2H$, in which y is an integer of 2–8. In a similar manner, these polyamides may be prepared also from said amines and amide-forming derivatives of these adds, such as esters, acid chlorides, amine salts, and the like. Typical examples of dicarboxylic acids used for manufacturing these polyamides include adipic acid, pimelic acid, suberic add, sebacic acid, and dodecane dicarboxylic acid, while typical dimes include hexamethylene diamine and octamethylene diamine.

Other polyamide types useful herein include those prepared by condensing an omega-amino carboxylic acid represented by the formula

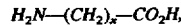

$H_2N-(CH_2)_x-CO_2H$, wherein x is an integer of 3–12, or intramolecular amides thereof.

Also included in the polyamides which may be useful herein are polyamides in which part of the diamine components are replaced by any of bis(3-aminopropyl)ether, bis (aminomethyl)cyclohexane, metaphenylene diamine, metaxylylene diamine, and 4,4-diaminodiphenylether, with part of the dicarboxylic acid components being replaced by any of isophthalic acid, terephthalic acid, and the like.

Specific examples of polyamides useful herein include polyhexamethylene adipamide (Nylon 66), polyhexamethylene azelamide (Nylon 69), polyhexamethylene sebacamide (Nylon 610), polyhexamethylene dodecanoamide (nylon 612), polycaprolactam (Nylon 6), polylauryl lactam, poly-11-amino-undecanomide, and bis-(paraamino-cyclohexyl) methane dodecanoamide. Other polyamides which can be used are those copolymers from two types selected from the above polymers or those obtained by terpolymerization of the above polymers or their components (for example, polymers prepared from adipic add and isophthalic acid and henmethylene diamine).

Typical heat stabilizers useful in the present invention include, for example, Group I metal halides (such as halides of sodium, potassium, lithin and cuprous copper, for example), chlorides, bromides, iodides, sterically-hindered phenols, hydroquinones, derivatives of the compounds of these groups, and mixtures thereof.

The present invention may also incorporate a combination of UV stabilizers with these heat stabilizers where the typical UV stabilizers include various substituted resorcinols, salicylates, benzotriazoles, benzophenones, and the like.

In the present invention, the heat stabilizer is first compounded with a polyamide composition, then melt mixed, extruded, and pelletized into master pellets. The amount of heat stabilizer used for incorporation into the polyamide composition should be adjusted so that when these master pellets are mixed with a dilution polyamide resin, the resultant mixture has a heat stabilizer content within the range typically necessary for heat stabilizing the mixture. Thus, for example, if a copper compound is selected as the heat stabilizer, the amount of copper ions in the mixture of master pellets and dilution polyamide resin is preferably in the range of 30–200 ppm.

The heat stabilized masterbatch (master pellets) can be diluted to any extent with the polyamide dilution resin where the effect of decreasing yellowing in a resultant molded article is greater with a higher dilution ratio. An advantageous effect is particularly recognized where the masterbatch is diluted by at least 50% with the dilution polyamide resin (see FIG. 2). However, if the masterbatch is diluted too much (for example, wherein the amount of the masterbatch in the final mixture is 1% or less), such a mixture becomes difficult to uniformly disperse in a molding machine, with the resultant possibility of color irregularities in the molded articles. A dilution ratio of about 2 (i.e., 50% of the masterbatch in the final mixture) will increase the cost of production. As such, the preferred dilution ratios are from 4 to not more than 100 (1% to 25% in terms of the amount of the masterbatch in the final mixture).

The concentration of the heat stabilizer in the masterbatch will vary depending upon the concentration of heat stabilizer desired in the final product and the dilution ratio used. For example, ff the final product is assumed to require a heat stabilizer concentration of 100 ppm in amount of copper ion, five times the dilution (20% masterbatch) will require 100× 5=500 ppm of copper in the masterbatch, or 100×10=1,000 ppm in the case of a 10-fold dilution (a 10% masterbatch).

The compositions of this invention may contain, in addition to stabilizers against oxidation, heat, and UV-degradation, common additives, such as inhibitors, lubricants, mold release agents, coloring agents (including dyes and pigments), fibrous or granular filler, reinforcing agent, plasticizer, and the like. These additives are normally added commonly in the mixing stages.

EXAMPLES

The present invention is specifically described by, but not limited by, the examples that follow. Unless otherwise noted, percentages in the examples below are based on weight.

EXAMPLE 1 i) Preparation Of the Master Chip

The desired amounts, as set forth in Table 1 below, of additive-free, dried nylon 66 pellets, a heat stabilizer (abbreviated as HS), N-stearyl erucamide (internal lubricant; abbreviated as HTSA), and aluminum distearate (Al-(St)$_2$; internal lubricant) were weighed and dry blended in a drum-type blender. The resultant mixture was melt extruded in a twin screw extruder (nine barrel sections; W&P Company, ZSK-40) with a temperature setting of 150° C. for the first barrel and 270° C. for the other barrels, with the number of screw revolutions set at 250 rpm. Feed was made all through the first barrel section for melt extrusion. The extruded strand was quenched with a water bath. Product was pelletized by a terminal-gripping cutter pelletizer to prepare master chips.

The heat stabilizer (HS) used in this example was a mixture of copper iodide and potassium iodide. The mixing ratio of the heat stabilizer used in the test was kept constant. The nylon 66 pellets used were a product of the DuPont Company. They had a relative viscosity (RV)=53. These were used to prepare master chips 1-1, 1-2, 1-3, 1-4, and 1-5.

The master chips had compositions as given in Table 1, below.

TABLE 1

| | Master Chips | | | | |
|---|---|---|---|---|---|
| | 1-1 | 1-2 | 1-3 | 1-4 | 1-5 |
| Nylon 66 | 99.25% | 98.5% | 98.125% | 92.50% | 85.00% |
| HS | 0.40% | 0.80% | 1.00% | 4.00% | 8.00% |
| HTSA | 0.25% | 0.50% | 0.625% | 2.50% | 5.00% |
| Al-(St)$_2$ | 0.10% | 0.20% | 0.25% | 1.00% | 2.00% | ii) Preparation of Heat Stabilized Polyamide Resins

Figure 2:
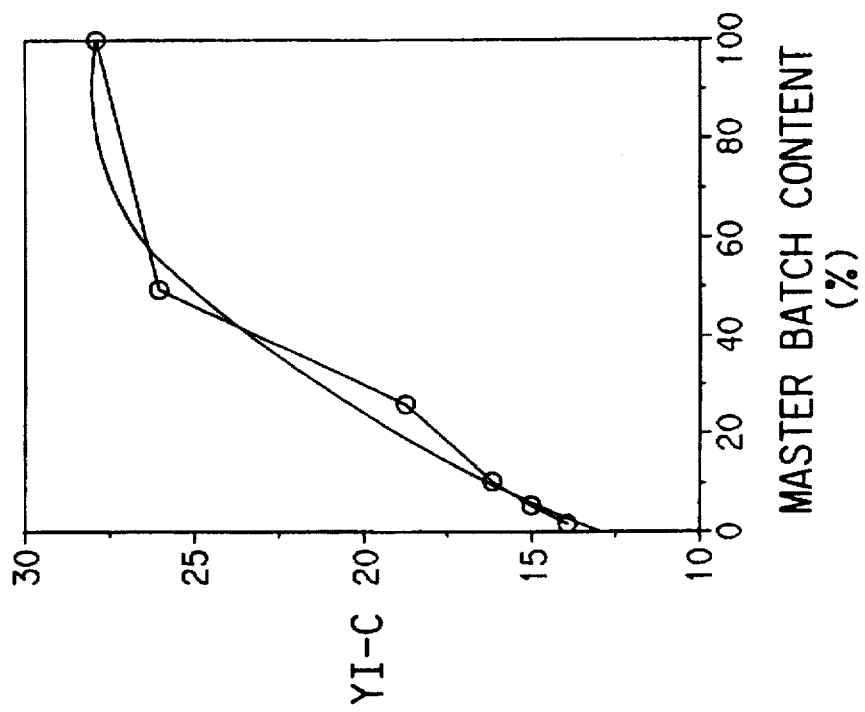
FIG. 2 A figure which shows the relationship between the masterbatch content and the YI-C value, with the copper ion content as the heat stabilizer held at a constant level of 150 ppm.
Figure 1:
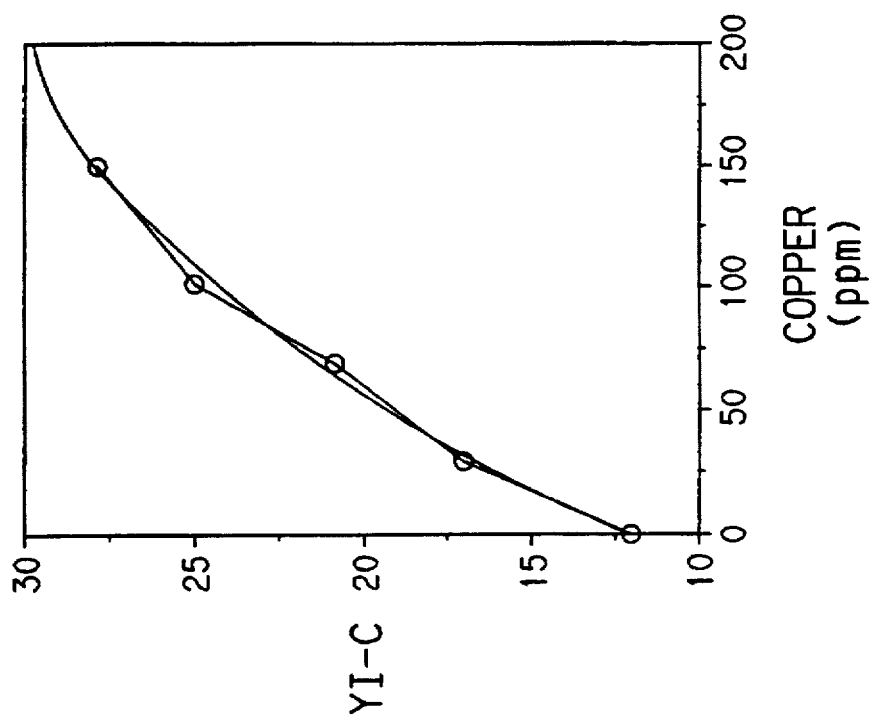
FIG. 1 a graph which shows a relationship between the amount of a copper compound added to a polyamide and the yellowing of the polyamide, in terms col YI-C values.

The nylon 66 master chips prepared in the above step i) were used to prepare test pieces. Test pieces where extruded from the same twin screw extruder as that used in the preparation of these master chips, with no dilution for master chip 1-1 (100% masterbatch content); by mixing with the same amount of additive-free nylon 66 pellets (dilution ratio 2) (50% masterbatch content) for master chip 1-2; mixing with three times the amount of additive-free nylon 66 pellets (dilution ratio of 3) (25% masterbatch content) for master chip 1-3; mixing with nine times the amount of additive-free nylon 66 pellets (dilution ratio 9) (10% masterbatch content) for master chip 1-4; and mixing with 19 parts by weight of additive-free nylon 66 pellets (dilution ratio of 19) (5% master-batch constant) for master chip 1-5, followed by measuring YI-C for these samples. The content of copper ions in each sample was held at a constant level of 150 ppm by varying the mixing ratio of the above nylon 66 pellets. The results of the YI-C measurement are given in FIG. 2 and Table 2, below. FIG. 2 shows that for the masterbatch content of 100%, a molded test piece from a master chip 1-1 alone had a YI-C value of 28. At a masterbatch content of 50% (that is, a molded test piece obtained from master chip 1-2 diluted at a dilution ratio of 2), the test piece had a YI-C value of 26. At a masterbatch content of 25% (that is, a molded test piece obtained from master chip 1-3 diluted at a dilution ratio of 3), the test piece had a YI-C value of 18. At a masterbatch content of 10% (that is, a molded test piece obtained from master chip 1-4 diluted at a dilution ratio of 9), the test piece had a YI-C value of 16. At a masterbatch content of 5% (that is, a molded test piece obtained from master chip 1-5 diluted at a dilution ratio of 19), the test piece had a YI-C value as low as 15, which is about half the value of the 100% masterbatch content.

TABLE 2

| Master Chip | Dilution Ratio | Masterbatch Content | YI-C |
|---|---|---|---|
| 1-1 | — | 100 | 28 |
| 1-2 | 2 | 50 | 26 |
| 1-3 | 3 | 25 | 18 |
| 1-4 | 9 | 10 | 16 |
| 1-5 | 19 | 5 | 15 |

EXAMPLE 2

Figure 3:
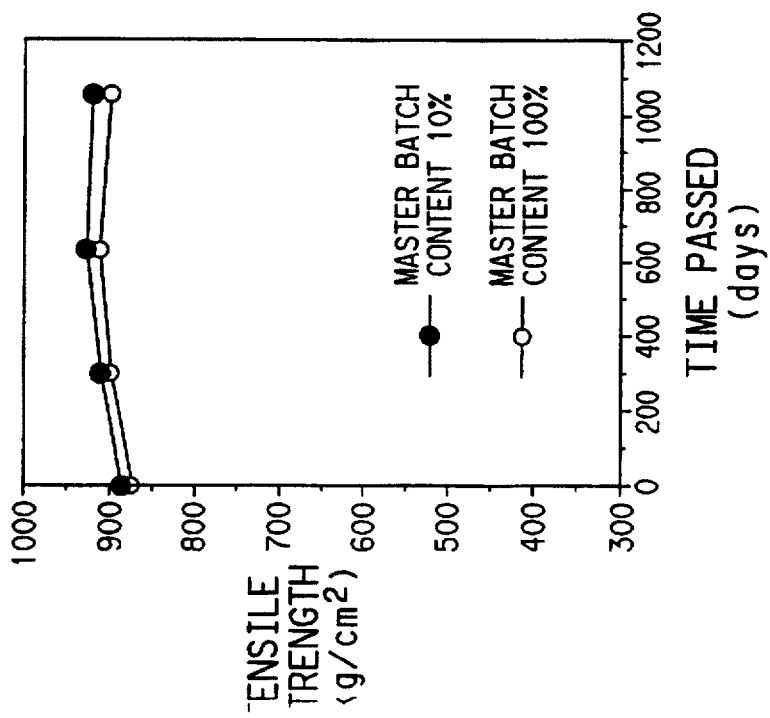
FIG. 3 A figure which shows a relationship between tensile strength and a change with time for a sample containing 100% masterbatch and a sample containing 10% masterbatch.

Master chip 1-1 of Example 1, without dilution, and master chip 1-4 mixed with nine times the amount of additive-free nylon 66 chips (dilution ratio of 9) were melt extruded. The change in time of the tensile strength was measured on the extrudates for these two samples and is reported in FIG. 3.

Figure 4:
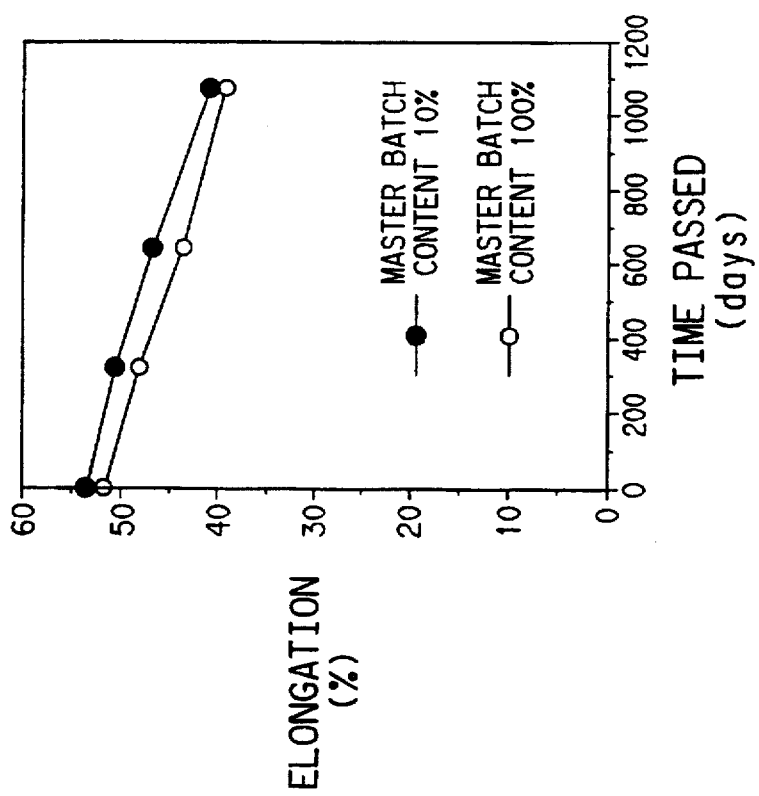
FIG. 4 A figure showing elongation of a 100% masterbatch sample and a 10% masterbatch sample and the change with the passage of time.

The change with time of elongation was also studied with the same samples. The results are given in FIG. 4. FIG. 4 shows that the incorporation of the additive in the form of a master chip to a nylon resulted in only a slight decrease in elongation. Although there is a drop in elongation with the passage of time, the tendency for reduction is identical to that obtained with a molded article from master chip 1-1 alone.

I claim:

1. A two step process for the manufacture of a molded polyamide product, comprising the steps of preparing master pellets containing a heat stabilizer by making a polyamide resin masterbatch by compounding a polyamide resin with a heat stabilizer, and then melt-mixing, extruding, and pelletizing the masterbatch with heating into master pellets, and diluting the concentration of the heat stabilizer in the master pellets by mixing the master pellets with a sufficient amount of a dilution polyamide resin to make a mixture having a heat stabilizer content within the range of that which is needed for heat stabilization of the mixture and melt molding the mixture under required heating to form a molded polyamide product.

2. The process of claim 1, wherein the heat stablizer is a Group I metal halide, chloride, bromide, iodide, sterically-hindered phenol, hydroquinone, a derivative thereof, or a mixture thereof.

3. The process of claim 1, wherein the heat stabilizer is a copper-containing compound providing an amount of copper ions in the mixture of master pellets and dilution polyamide resin in the range of 30–200ppm.

* * * * *